United States Patent
Carlson et al.

(10) Patent No.: US 7,603,114 B2
(45) Date of Patent: Oct. 13, 2009

(54) PROVIDING LOCATION INFORMATION FOR WIRELESS DEVICES USING NAME SERVICE

(75) Inventors: Steven I. Carlson, Kenmore, WA (US); Anthony F. Billera, Bellevue, WA (US)

(73) Assignee: AT&T Mobilty II LLC, Atlanta, GA (US)

( * ) Notice: Subject to any disclaimer, the term of this patent is extended or adjusted under 35 U.S.C. 154(b) by 116 days.

(21) Appl. No.: 10/685,614

(22) Filed: Oct. 14, 2003

(65) Prior Publication Data
US 2005/0079879 A1   Apr. 14, 2005

(51) Int. Cl.
*H04W 4/00* (2009.01)
(52) U.S. Cl. .............. 455/415; 455/456.1; 455/461; 379/207.12; 379/207.13; 379/207.14; 379/207.15
(58) Field of Classification Search .......... 455/414.4, 455/433, 456, 456.5, 457, 461, 569.1, 456.6, 455/517, 518, 519, 414.2, 415, 456.1; 379/207.12–207.15
See application file for complete search history.

(56) References Cited

U.S. PATENT DOCUMENTS

| | | | | |
|---|---|---|---|---|
| 5,727,057 A | * | 3/1998 | Emery et al. | 379/201.07 |
| 5,802,468 A | * | 9/1998 | Gallant et al. | 455/422.1 |
| 2002/0137497 A1 | * | 9/2002 | Gillespie | 455/415 |
| 2003/0016804 A1 | * | 1/2003 | Sheha et al. | 379/201.06 |
| 2003/0063730 A1 | * | 4/2003 | Woodring | 379/207.15 |
| 2003/0119522 A1 | * | 6/2003 | Barclay et al. | 455/456 |
| 2004/0203629 A1 | * | 10/2004 | Dezonno et al. | 455/414.1 |
| 2004/0257274 A1 | * | 12/2004 | Benco et al. | 342/357.1 |
| 2004/0266490 A1 | * | 12/2004 | Silver | 455/567 |

* cited by examiner

*Primary Examiner*—Charles N. Appiah
*Assistant Examiner*—Jaime M Holliday
(74) *Attorney, Agent, or Firm*—Moazzam & Associates, LLC

(57) ABSTRACT

A caller number is provided to a network element that associates name information with the caller number. The network element receives location information for the caller and provides the location information and name information as a response to being provided the caller number.

15 Claims, 8 Drawing Sheets

PROVIDING LOCATION INFORMATION FOR WIRELESS DEVICES USING NAME SERVICE

TECHNICAL FIELD

The present disclosure relates to providing location information about a wireless device.

BACKGROUND

Wireless telephones are devices capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

A network that serves wireless devices may provide a location service. For example, mapAMobile provides such a service in the United Kingdom. The location service may make it possible to geographically locate wireless devices that interact with the network. For example, the network may identify the location of a caller's wireless device (e.g. "Gilman Street in Redmond, Wash.") and provide this location information to a called party's wireless device. However, due to constraints in the amount of data that may be communicated during an arriving call, it remains a challenge to provide location information to wireless devices in a manner that is both timely and detailed.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A caller number is provided to a network element, such as a Line Information Database, that associates name information with the caller number. The network element receives location information for the caller, for example from a Gateway Mobile Location Center, and provides the location information and name information as a response to being provided the caller number. The name and location information may be provided as part of a Caller Name Address Presentation (CNAP) service.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
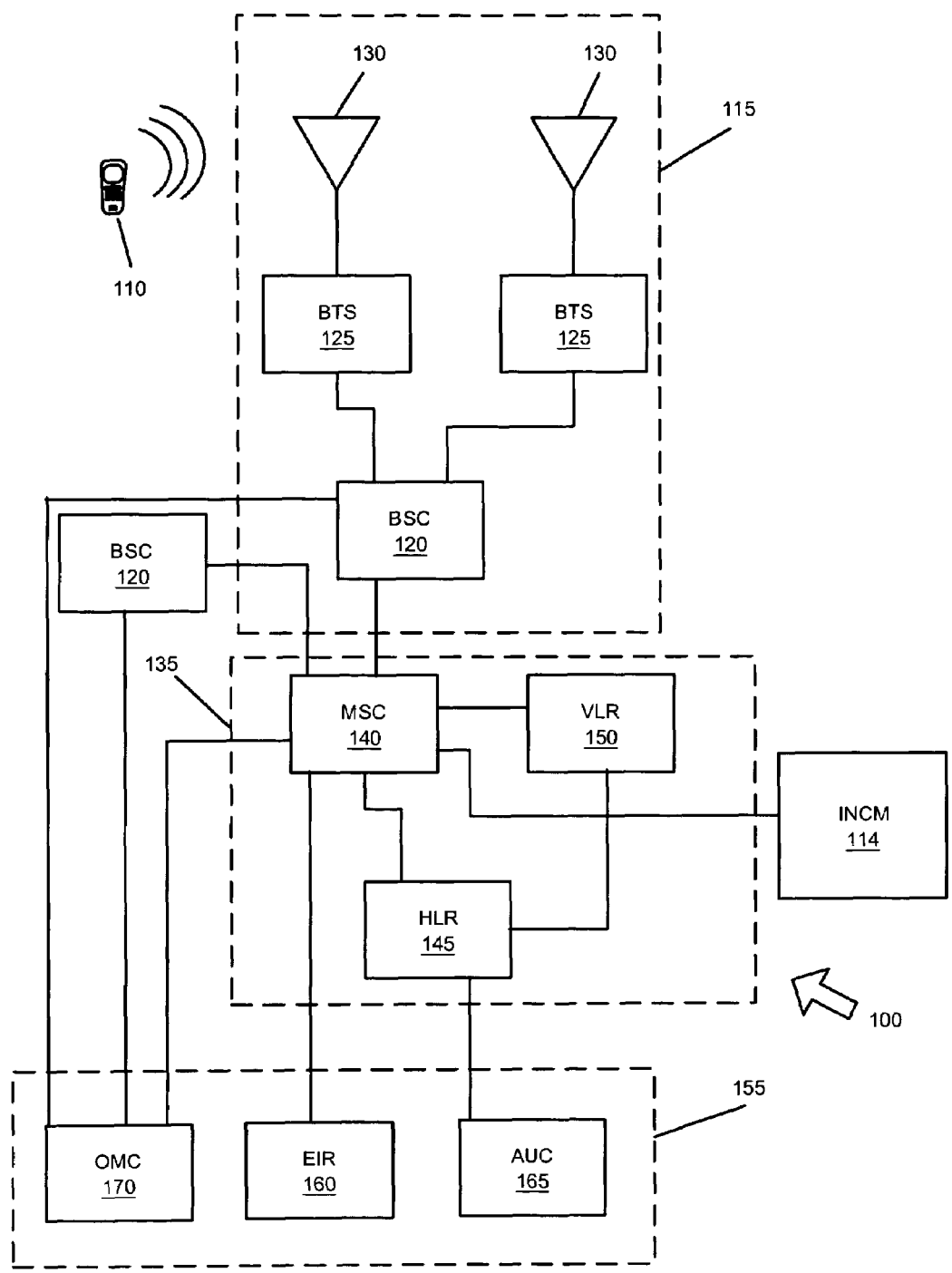
FIG. 1 is a block diagram of an embodiment of a wireless network.

FIG. 1 is a block diagram of an embodiment of a wireless network. A wireless device 110 communicates with a base station subsystem (BSS) 115 comprising base station controllers (BSC) 120 coupled to one or more base transceiver stations (BTS) 125. In turn, each BTS 125 is coupled to one or antennae 130.

The BTS 125 includes transmitting and receiving equipment to create a radio interface between the wireless network and terminal devices. Although the antennae 130 are shown as separate elements for clarity, it is common in the industry to collectively refer to the antennae 130, transmitter, and receiver, as the BTS.

The BSC 120 may perform management of the radio interface by allocating channels, managing handover from one BTS to another, paging the wireless device, and transmitting connection-related signaling data.

The networking and switching subsystem (NSS) 135 of a wireless network comprises a Mobile Switching Center (MSC) 140, a Home Location Registry (HLR) 145, and a Visitor Location Registry (VLR) 150. Switching and network management functions are carried out by the NSS 135. The NSS 135 may also act as a gateway between the wireless network and other networks such as the Public Switched Telephone Network (PSTN), Integrated Services Digital Network (ISDN), the Internet, corporate intranets, other wireless networks, and the Public Data Network (PDN). These other networks are collectively referred to as Internetwork Communication Media (INCM) 114.

The MSC 140 is a switching mechanism that routes communications and manages the network. In GPRS networks, GPRS support nodes (GSNs) such as Switching GSNs (SGSNs) and Gateway GSNs (GGSNs) may provide switching operations similar to those provided by the MSC 140. There can be many switches 140 in a communication network, each responsible for the signaling required to set up, maintain, and terminate connections to wireless devices within the geographical area served by the switch 140. Each MSC (switch) 140 may manage several BSC 120. The MSC 140 is coupled to a Home Location Registry (HLR) 145 and a Visitor Location Registry (VLR) 150. The HLR 145 is also coupled to the VLR 150. The HLR 145 and VLR 150 may comprise certain dynamic or temporary subscriber data such as current Location Area (LA) of the subscriber's mobile station and Mobile Station Roaming Number (MSRN). Subscriber-related data is recorded in the HLR 145 from which billing and administrative information is extracted when needed by the cellular service provider. Some wireless networks have only one HLR 145 that serves all subscribers; others have multiple HLRs.

The MSC 140 uses the VLR 150 to manage the wireless devices that are currently roaming in the area controlled by the MSC 140. The VLR 150 stores information such as the International Mobile Subscriber Identity (IMSI), authentication data, and telephone number of the roaming wireless devices. The VLR 150 may obtain and comprise subscriber information, such as information about the services to which a roaming wireless device is entitled, from the HLR that serves the wireless device. The VLR 150 controls a pool of MSRN and allocates an MSRN and TMSI to the roaming wireless device. The VLR 150 sends the MSRN and Temporary Mobile Subscriber Identity (TMSI) information to the HLR 145 where they are stored with the subscriber's dynamic records for later use in call routing.

The operation subsystem (OSS) 155 may include an Equipment Identity Register (EIR) 160, an Authentication Center (AuC) 165, and an Operating and Maintenance Center (OMC) 170. The OSS 155 may provide subscription management, network operation, network maintenance, and mobile equipment management.

The AuC 165 stores data related to network security and authentication of wireless devices and subscribers. A purpose of the AuC 165 is to prevent fraud by verifying the identity of subscribers and/or devices that try to access the network. Thus the AuC 165 may comprise authentication algorithms and encryption codes necessary to protect a subscriber's access rights and identity and to prevent eavesdropping.

The EIR 160 is a database which stores International Mobile Equipment Identity (IMEI) numbers. Wireless devices are uniquely identified by an IMEI or equivalent number such as an Electronic Serial Number (ESN). An EIR 160 generally indicates the status of a particular wireless device by flagging the IMEI of a device identified stolen, suspended, or malfunctioning.

The OMC 170 monitors and controls other network elements to enhance system performance and quality. The OMC 170 also administers billing, subscriber service data, and generation of statistical data on the state and capacity of the network.

Figure 2:
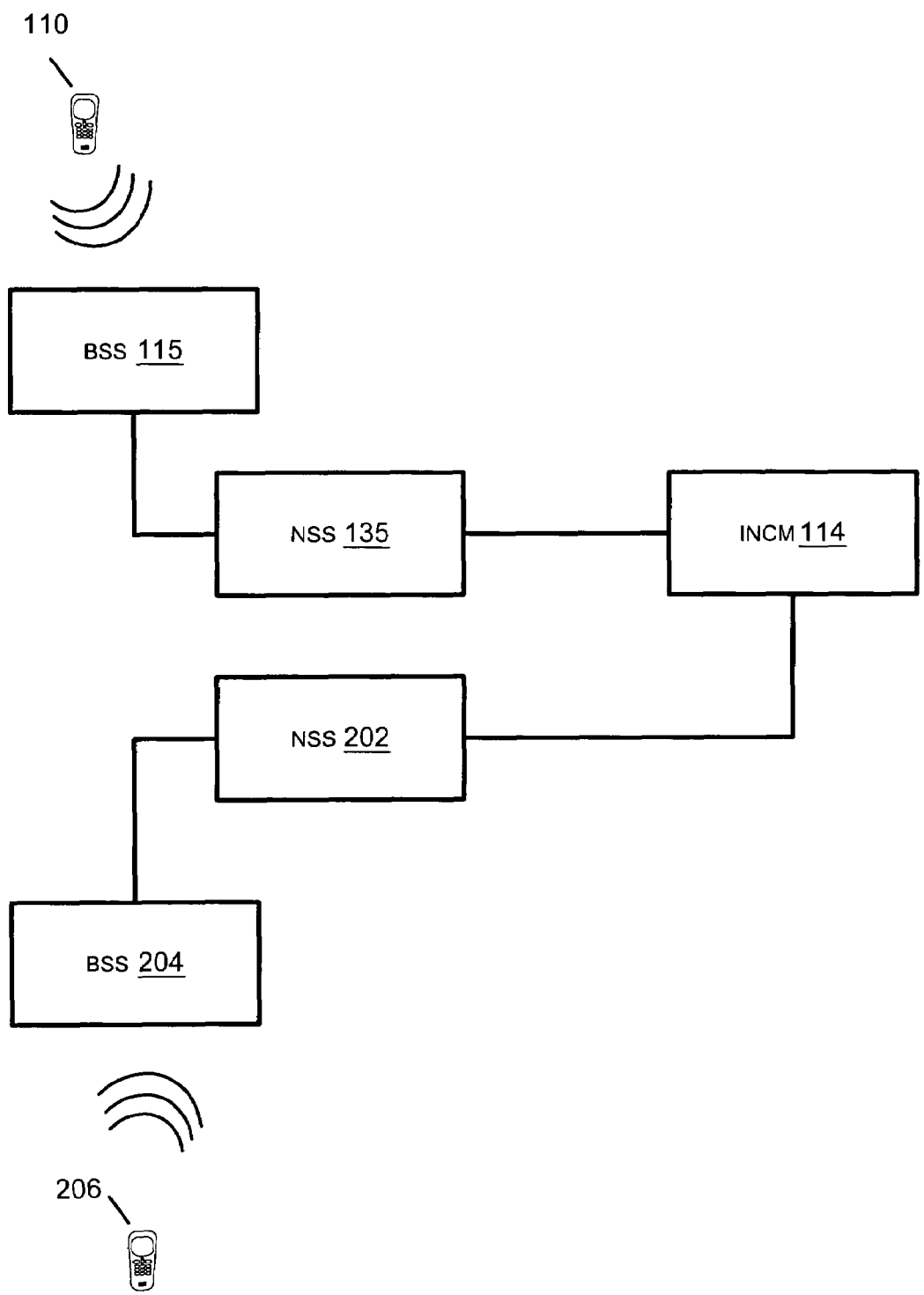
FIG. 2 is a block diagram of an embodiment of a wireless network involving multiple base station subsystems and network switching subsystems.

FIG. 2 is a block diagram of an embodiment of a wireless network involving multiple base station subsystems and network switching subsystems. A first wireless device 110 communicates with a second wireless device 206. The first wireless device communicates with a first NSS 135 by way of a first BSS 115. The INCM 114 couples the first NSS 135 with a second NSS 202. The second NSS 202 may be part of a network operated by a different provider (e.g. AT&T Wireless™, Verizon Wireless™, and so on) than the first NSS 135. The first and second NSS 135,202 may communicate without use of the INCM 114 when part of a network operated by the same provider. A second wireless device 206 communicates with the second NSS 202 by way of a second BSS 204.

Figure 3:
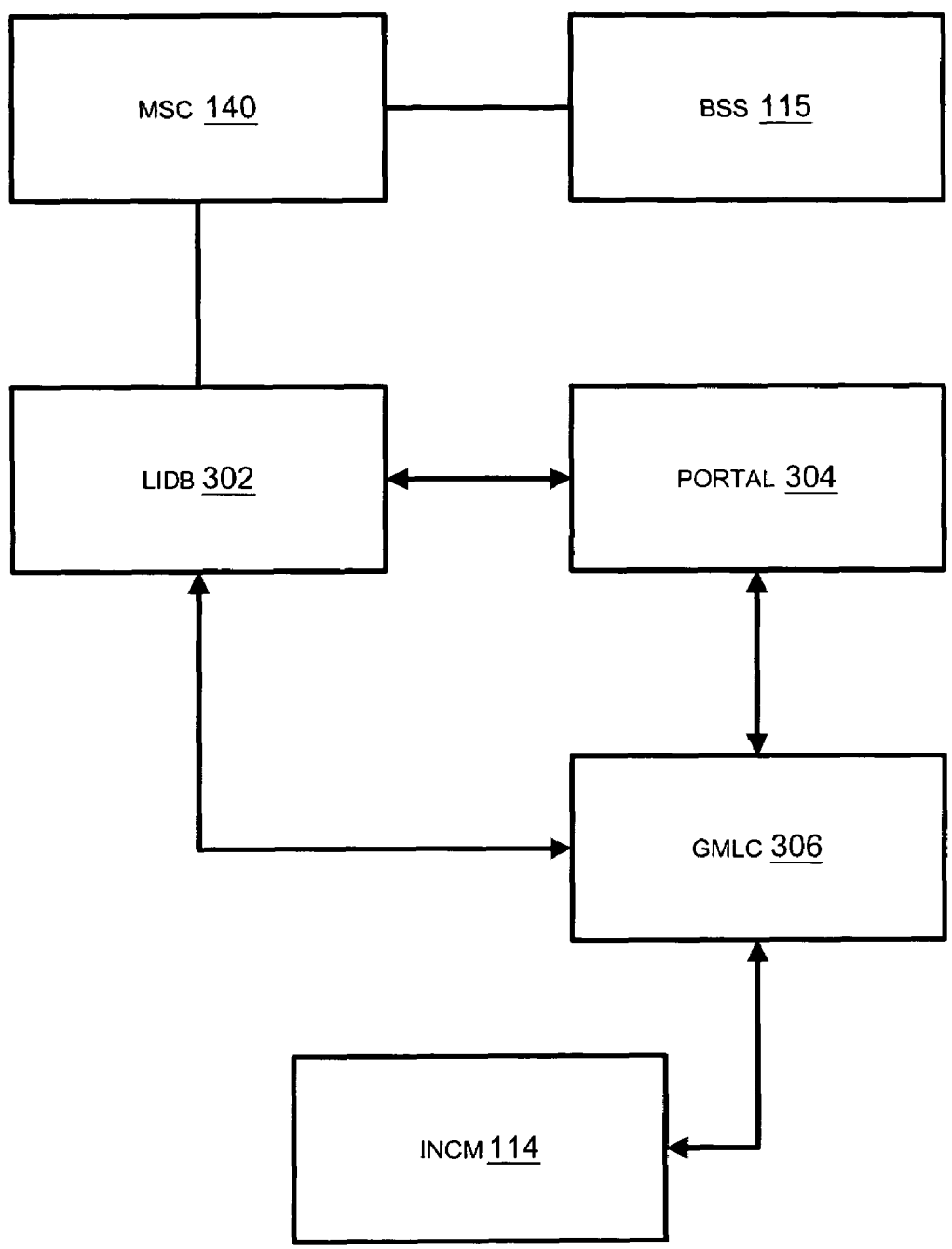
FIG. 3 is a block diagram of an embodiment of an arrangement to provide location information.

FIG. 3 is a block diagram of an embodiment of an arrangement to provide location information. The MSC 140 is coupled to a Line Information Datebase (LIDB) 302, a network element typically employed in communication networks to provide validation of collect and third party calls, among other things. A network element is any one or more devices that participate at least occasionally in the operation of the network.

The LIDB 302 is coupled to a portal 304 and, either additionally or alternatively, to a Gateway Mobile Location Center (GMLC) 306. The portal 304 provides an interface between network protocols and services, and Internet protocols and services. For example, the portal 304 could provide an interface whereby communications using Internet Protocol (IP), Hypertext Transfer Protocol (HTTP), or File Transfer Protocol (FTP), to name just a few, result in requests for network services via Signaling System 7 (SS7) or other network communication methods. The GMLC 306 comprises information about the location of wireless devices that interact with the network. The GMLC 306 may receive this information from various network elements, including the HLR 145, the MSC 140, and the BSS 115.

In some embodiments, functionality of the LIDB 302 may be provided by network elements of the NSS 135 (e.g. the HLR 145).

In some embodiments, functionality of the GMLC 306 may be provided by elements of the BSS 115 and NSS 135.

Figure 4:
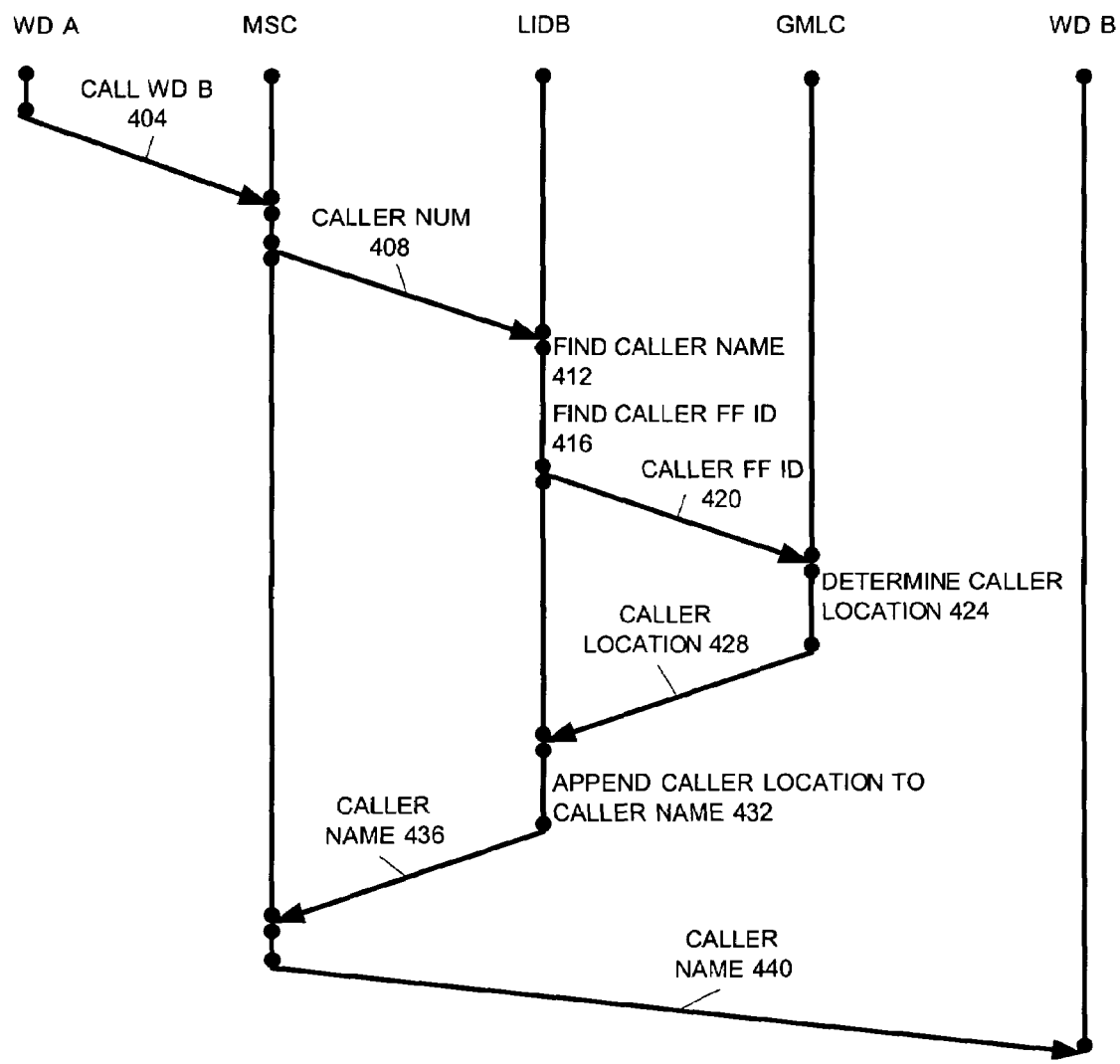
FIG. 4 is an action diagram of an embodiment of a method to provide location information using a name service.

FIG. 4 is an action diagram of an embodiment of a method to provide location information using a name service. Name services associate a call from a wireless device with a name of the person making the call. The name can be provided along with the call to the device being called. This gives the called party the opportunity to decide if and how to respond to the call.

Alternatively, providing the location information may not involve associating a name with the call. Instead, invoking the name service may result in returning location information instead of name information.

At 404 a call is made from a first wireless device (WD A) to a second wireless device (WD B) by providing call information from the first wireless device to an MSC. The call information includes the phone number or other identifier of the first wireless device. At 408 this identifier is provided from the MSC to a LIDB, as part of a request for a name to associate with the caller (for example, as part of the Calling Name Address Presentation (CNAP) service). At 412 the LIDB locates a name for the caller, corresponding to the provided identification. Alternatively, the LIDB may provide a default name for the caller. At 416 the LIDB locates a Friend Finder™ ID (FF ID) for the caller. The FF ID is an identification that is used by a GMLC to identify the mobile device for purposes of location. In some embodiments, the FF ID may be the caller's phone number, MSISDN, or other identification of the wireless device employed by the caller.

At 420 the caller's FF ID is provided by the LIDB to a GMLC. At 424 the GMLC employs the FF ID to determine the caller's location. At 428 the GMLC provides location information for the caller to the LIDB. The location information provided by the GMLC may be detailed, or highly abbreviated, such as latitude and longitude coordinates (e.g. 3224, where the first two digits are a latitude and the second two are a longitude). At 432 the LIDB combines the provided location information with name information for the caller, and returns this information to the MSC at 436. At 440 the MSC provides the name information (which includes the abbreviated location information) to the second wireless device.

If the caller settings indicate that the caller is 'invisible', e.g. that location information should not be provided for the caller, only name information for the caller may be located and returned. If the caller settings indicate that the caller is 'anonymous', e.g. that name information should not be provided for the caller, only location information for the caller may be located and returned (unless the caller is also 'invisible'). Alternatively, if the caller is either invisible or anonymous, then neither name or location information is returned. The caller settings may indicate that the caller is invisible and/or anonymous only in all areas, or only in particular areas. In the former case, the name and/or location information is not returned. In the latter case, the name and/or location information is returned only when it is determined that the caller is not in one of the invisible and/or anonymous locations.

Figure 5:
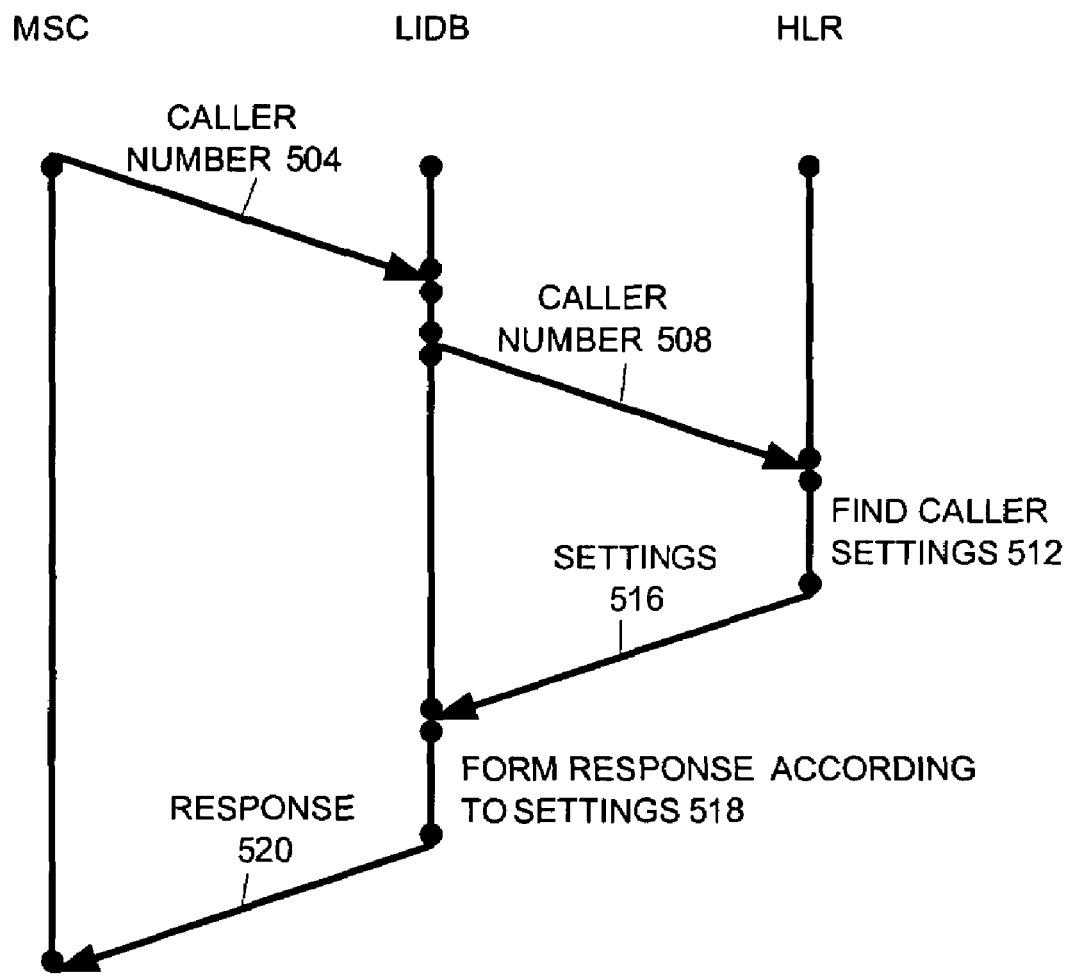
FIG. 5 is an action diagram of an embodiment of a method to provide location information according to a subscriber's settings.

FIG. 5 is an action diagram of an embodiment of a method to provide location information according to a subscriber's settings. At 504 the caller's number is provided to the MSC by the LIDB. At 508 the LIDB provides the caller's number to an HLR (or to a network element providing similar functionality, such as a VLR if the subscriber is roaming on the network). At 512 the HLR locates subscriber information corresponding to the caller's number, including caller settings for how to combine location and name information. These caller settings could also be comprised by the LIDB, so that the HLR need not be involved. In another embodiment the HLR or LIDB may locate subscriber information corresponding to the called party (called party number or other identifier may be provided by the MSC, LIDB, or other network element), including settings for how to combine location and name information for callers. At 516 the settings are provided from the HLR to the LIDB. At 518 the LIDB forms a response to the MSC by combining the caller's name and location information (obtained, for example, as shown in FIG. 4) according to the settings. For one example, the settings may determine that only up to four locations of the caller's name may be replaced with location information, in which case highly abbreviated location information may be provided in the response to the MSC. For another example, the settings may determine that half, or all of the caller's name may be replaced with location information, in which case more detailed location information may be provided in the response to the MSC.

When no settings are available for the caller, default settings may be applied. When no name is available for the caller, a default name (which may be short, or empty) may be provided, and the location information may occupy most or all of the space available under the name service for providing the name information.

Figure 6:
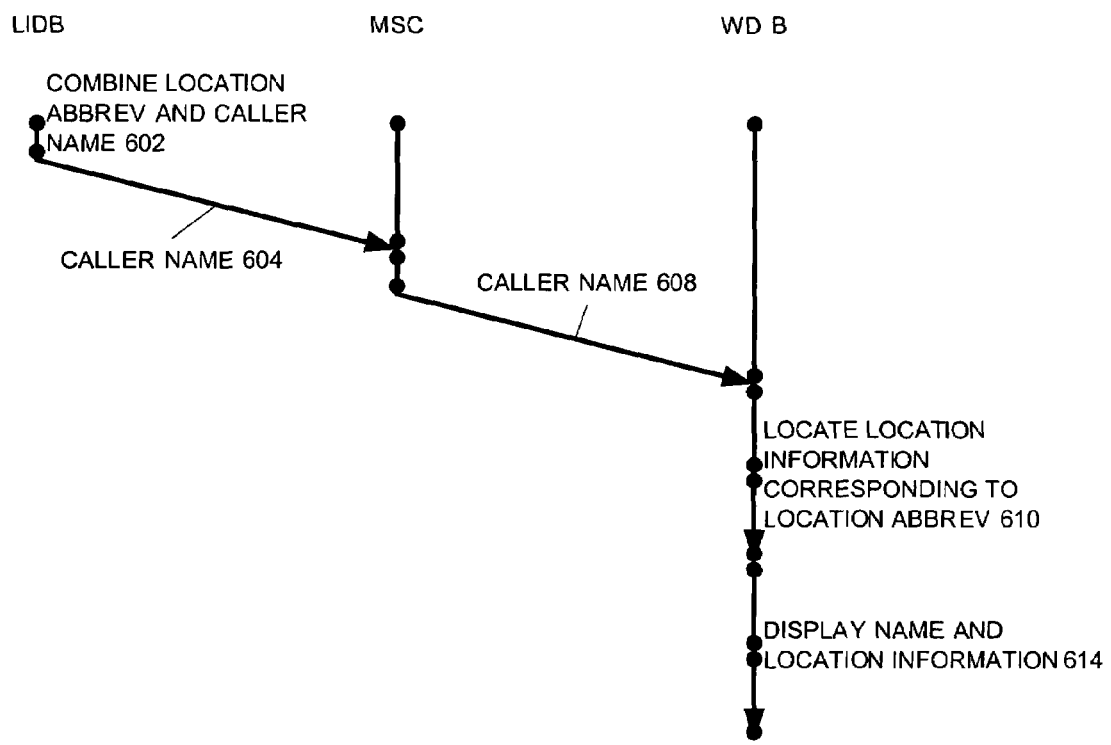
FIG. 6 is an action diagram of an embodiment of a method to expand abbreviated location information into more detailed location information.

FIG. 6 is an action diagram of an embodiment of a method to expand abbreviated location information into more detailed location information. At 602 the LIDB combines abbreviated location information for the caller with name information for the caller, into a response to a request from the MSC for the caller's name. The caller's name (e.g. a response to the request for the caller's name) is provided from the LIDB to the MSC at 604. At 608 the MSC provides the response provided by the LIDB to the wireless device that is being called. At 610 the wireless device locates more detailed location information corresponding to the abbreviated location information provided with the call. For one example, the wireless device (which may, in fact, comprise non-wireless connections to the Internet or other networks) may locate a street address corresponding to latitude and longitude coordinates. For another example, the wireless device may display a map emphasizing the location corresponding to the abbreviated location information. The map information may be stored in a memory of the wireless device, or the map information may be obtained from a network to which the wireless device has access, or the map information may be obtained from a personal computer or other computing device to which the wireless device is coupled. For another example, the wireless device may display a building, address, or other location information configured by a user of the wireless device to correspond to the abbreviated information.

The wireless device displays the name and more detailed location information at 614.

Figure 7:
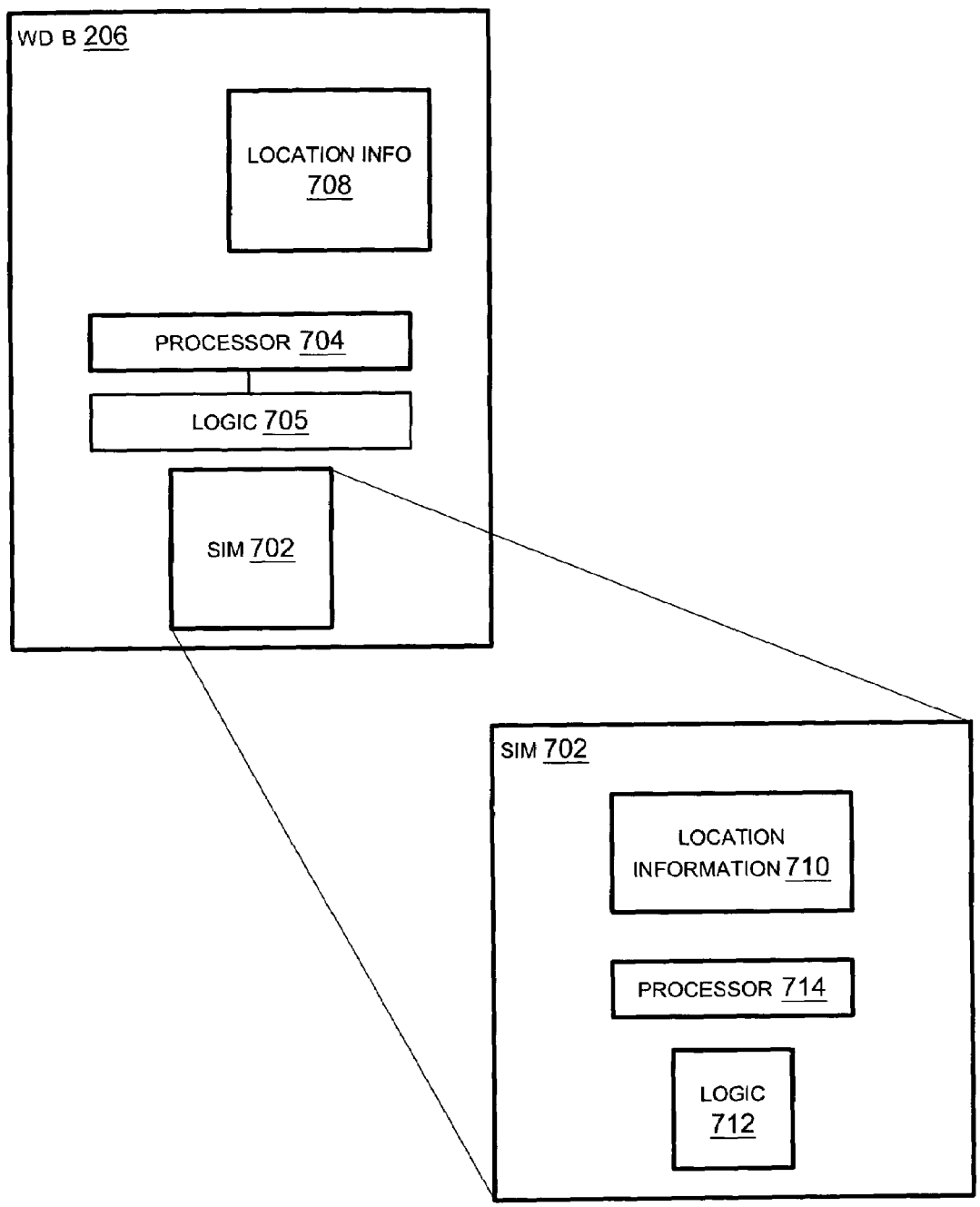
FIG. 7 is a block diagram of an embodiment of a wireless device adapted to expand abbreviated location information into more detailed location information.

FIG. 7 is a block diagram of an embodiment of a wireless device adapted to expand abbreviated location information into more detailed location information. The wireless device 206 comprises a processor 704 and logic 705. The logic 705 may be applied to the processor 704 to locate detailed location information 708 corresponding to abbreviated location information provided along with a caller's name.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

The wireless device 206 may comprise a Subscriber Identity Module (SIM) 702. The SIM 702 may comprise a processor 714 and logic 712. The logic 705 may be applied to the processor 704 to locate detailed location information 708 corresponding to abbreviated location information provided along with a caller's name. An advantage of locating the location information in the SIM is that the location information 710 is portable as the SIM 702 is relocated among wireless devices. In other embodiments, the processor 704 and logic 705 of the wireless device 206 may be used to associated detailed location information 710 comprised by the SIM 702 with abbreviated location information received with the caller's name.

Figure 8:
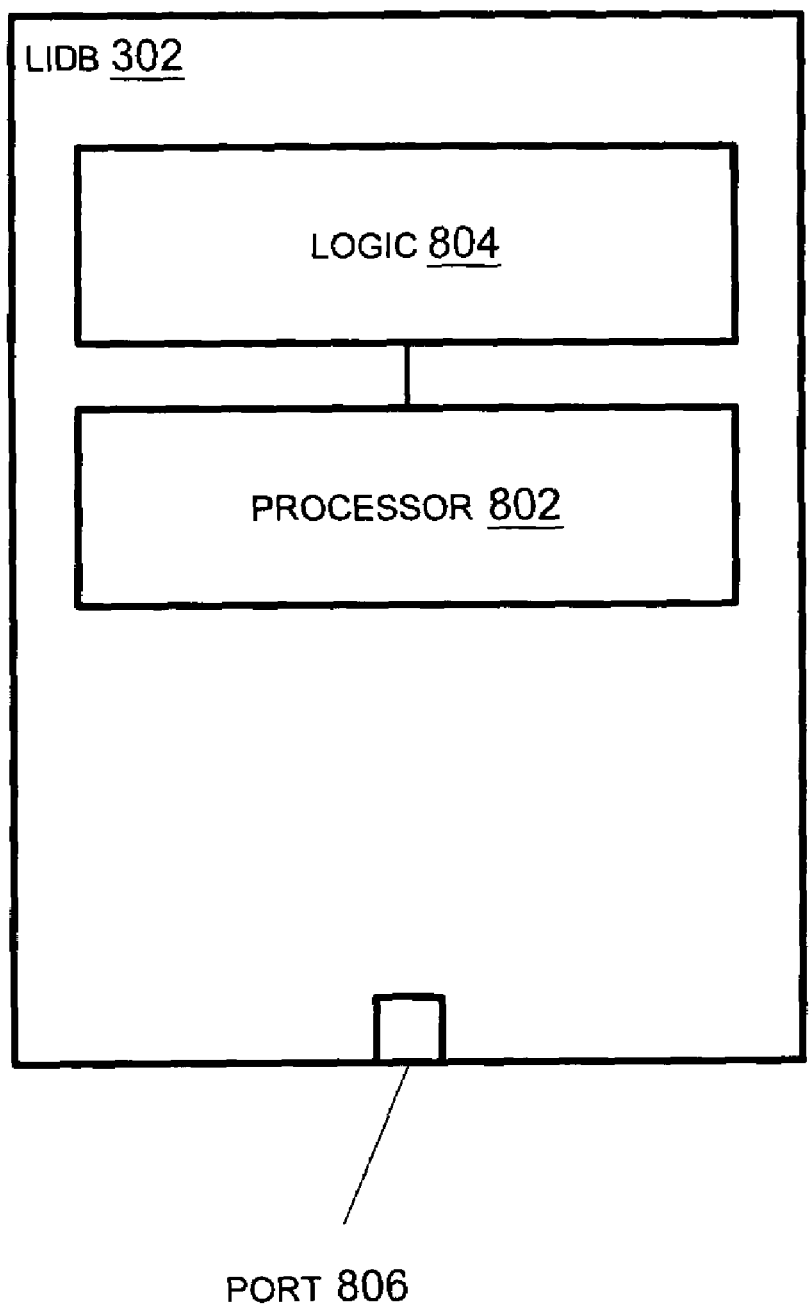
FIG. 8 is a block diagram of an embodiment of a Line Information Database.

FIG. 8 is a block diagram of an embodiment of a Line Information Database (LIDB). The LIDB 302 comprises a processor 802 and logic 804 that, when applied to the processor 802, results in acts of the LIDB 302 as described herein. The LIDB 302 comprises a port 806 by which interactions may take place with a switch (such as MSC 140), the GMLC 306, the portal 304, and possibly other network elements as well.

What is claimed is:

1. A method comprising:
   a mobile switching center providing a caller number to a Line Information Database that associates name information with the caller number to initiate a request;
   the Line Information Database receiving location information for the caller from a Gateway Mobile Location Center, which comprises information about the location of a plurality of wireless devices that interact with a network;
   the Line Information Database abbreviating the location information in the response;
   the Line Information Database replacing at least a portion of the name information with the abbreviated location information to create amalgamated name and location information; and
   the Line Information Database providing the amalgamated location information and name information to the mobile switching center as a response to being provided the caller number.

2. The method of claim 1, further comprising:
   the Line Information Database replacing the location information and name information according to settings for the caller.

3. The method of claim 1, further comprising:
   the Line Information Database replacing the location information and name information according to settings for a called party.

4. The method of claim 1, further comprising:
   the Line Information Database locating a Friend Finder ID associated with the caller, and providing the Friend Finder ID to the GMLC.

5. The method of claim 1, further comprising:
   the caller number provided to the network as part of a Caller Name Address Presentation (CNAP) service.

6. A wireless device comprising:
   logic that, when applied to a processor, results in extracting abbreviated location information from amalgamated name and location information received for a caller from a Line Information Database, and retrieving the detailed location information for the caller corresponding to the abbreviated location information;
   wherein said amalgamated name and information comprises at least a portion of the abbreviated location information and at least a portion of the name information and wherein the Line Information Database associates name information with the caller number received from a mobile switching center and receives location information for the caller from a Gateway Mobile Location Center.

7. The wireless device of claim 6, further comprising:
   logic that, when applied to the processor, results in locating a street address corresponding to the abbreviated location information.

8. The wireless device of claim 6, further comprising:
   logic that, when applied to the processor, results in locating and displaying a location on a map corresponding to the abbreviated location information.

9. The wireless device of claim 6, further comprising:
   logic that, when applied to the processor, results in locating detailed location information configured by a user of the wireless device to correspond to the abbreviated location information.

10. The wireless device of claim 6, further comprising:
    a Subscriber Identity Module (SIM) comprising the detailed location information.

11. A network element comprising:
    a processor;
    at least one port;
    a Gateway Mobile Location Center, which comprises information about the location of a plurality of wireless devices that interact with a network; and
    logic on a Line Information Database that results in servicing at least one request for caller name information by associating a caller number received via the at least one port with caller name information, and obtaining location information for the caller via the at least one port, and providing an amalgamation of a portion of the name information and the location information to a mobile switching center via the at least one port in response to the at least one request for caller name information,
    wherein the Line Information Database associates name information with the caller number and receives location information for the caller from the Gateway Mobile Location Center.

12. The network element of claim 11, further comprising:
    logic on the Line Information Database that obtains settings for the caller via the at least one port and applies the settings to determine how to amalgamate the name information and location information.

13. The network element of claim 11, further comprising:
    logic on the Line Information Database that abbreviates the location information before amalgamating the location information along with the name information.

14. The network element of claim 11, further comprising:
    logic on the Line Information Database that provides Calling Name Address Presentation including the amalgamated name information and location information.

15. The network element of claim 11, further comprising:
    logic on the Line Information Database that locates a Friend Finder ID corresponding to the caller, and provides the Friend Finder ID via the at least one port to the GMLC.

* * * * *